US010142917B2

(12) United States Patent
Narasimhan et al.

(10) Patent No.: US 10,142,917 B2
(45) Date of Patent: Nov. 27, 2018

(54) ELECTRONIC SUBSCRIBER IDENTITY MODULE (ESIM) ASSIGNMENT FOR CARRIER CHANNEL DEVICES (71) Applicant: Apple Inc., Cupertino, CA (US)

(72) Inventors: Avinash Narasimhan, Cupertino, CA (US); Devin B. Collier, San Jose, CA (US); Clark P. Mueller, San Jose, CA (US); David T. Haggerty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/649,283

(22) Filed: Jul. 13, 2017

(65) Prior Publication Data

US 2018/0027480 A1    Jan. 25, 2018

Related U.S. Application Data (60) Provisional application No. 62/365,227, filed on Jul. 21, 2016.

(51) Int. Cl.
  *H04W 48/00*  (2009.01)
  *H04W 48/08*  (2009.01)
  (Continued)

(52) U.S. Cl.
  CPC ............ *H04W 48/08* (2013.01); *H04W 4/60* (2018.02); *H04W 8/183* (2013.01); *H04W 12/06* (2013.01);
  (Continued)

(58) Field of Classification Search
  CPC ..... H04W 48/08; H04W 12/06; H04W 8/183; H04W 74/08; H04W 4/60; H04L 41/0806; H04L 63/0869; H04B 1/3816
  See application file for complete search history.

(56) References Cited

U.S. PATENT DOCUMENTS 8,442,521 B2  5/2013  Fleischman et al.
9,419,970 B2  8/2016  Haggerty et al.
(Continued)

OTHER PUBLICATIONS

RSP Technical Specification; GSM Association; Official Document SGP.22—RSP Technical Specification; Version 1.0; Jan. 13, 2016; 114 pgs.

*Primary Examiner* — Khai M Nguyen
(74) *Attorney, Agent, or Firm* — Dickinson Wright RLLP (57) ABSTRACT A pool of devices is initially associated under a single product type identifier, for example, a single stock keeping unit (SKU) identifier. Each device is associated with a secure element (SE), for example, an embedded universal integrated circuit card (eUICC). A wireless telecommunications carrier purchases a subset of the devices from the owner of the pool of devices. A policy management server receives a shipment record and associates the subset of devices with a product identifier and with a carrier-specific activation policy. The policy management server sends an electronic subscriber identity module (eSIM) reservation request to a policy evaluation server, which contacts an eSIM delivery server associated with the purchasing carrier. The eSIM delivery server reserves eSIMs for the purchased devices. When an end user buys one of the devices from the subset, the purchased device is provisioned by the eSIM delivery server with the eSIM reserved for that device.

20 Claims, 7 Drawing Sheets (51) Int. Cl.
*H04W 12/06* (2009.01)
*H04W 8/18* (2009.01)
*H04W 4/60* (2018.01)
*H04L 12/24* (2006.01)
*H04B 1/3816* (2015.01)
*H04L 29/06* (2006.01)
*H04W 74/08* (2009.01)

(52) U.S. Cl.
CPC ........ *H04B 1/3816* (2013.01); *H04L 41/0806* (2013.01); *H04L 63/0869* (2013.01); *H04W 74/08* (2013.01)

(56) References Cited

U.S. PATENT DOCUMENTS

| | | | |
|---|---|---|---|
| 9,451,450 B2 * | 9/2016 | Fleischman | H04W 8/245 455/435.1 |
| 9,723,481 B2 * | 8/2017 | Schell | H04W 8/265 455/558 |
| 2006/0135144 A1 | 6/2006 | Jothipragasam | |
| 2011/0281551 A1 * | 11/2011 | Gonzalez | H04M 15/00 455/406 |
| 2012/0108295 A1 | 5/2012 | Schell et al. | |
| 2013/0157673 A1 | 6/2013 | Brusilovsky | |
| 2015/0031413 A1 * | 1/2015 | Haggerty | H04L 63/0272 455/558 |

\* cited by examiner

ELECTRONIC SUBSCRIBER IDENTITY MODULE (ESIM) ASSIGNMENT FOR CARRIER CHANNEL DEVICES

CROSS REFERENCE TO RELATED APPLICATION

This application claims benefit of U.S. Provisional Patent Application No. 62/365,227, entitled "ELECTRONIC SUBSCRIBER INFORMATION MODULE (eSIM) ASSIGNMENT FOR CARRIER CHANNEL DEVICES," filed on Jul. 21, 2016, which is hereby incorporated by reference.

FIELD

The described embodiments relate to reservation of electronic subscriber identity modules (eSIMs) for devices after manufacture of the devices and to provisioning of the eSIMs to the devices after distribution of the devices through carrier channels.

BACKGROUND

Designers and producers of devices keep track of manufactured devices with SKU (stock keeping unit) numbers, identifiers or codes. A SKU represents a distinct type of item for sale. A SKU also represents attributes of a product, such as description, color, and size. When a business takes an inventory, it counts the quantity it has of each item associated with a given SKU. Within a group of devices with the same SKU, each item has a unique identifier. Examples of unique device identifiers used in the manufacture and use of wireless devices are serial numbers and international mobile equipment identifiers (IMEIs).

Aspects of remote SIM provisioning include the downloading, installing, enabling, disabling, switching and deleting of a profile on an electronic universal integrated circuit card (eUICC). An eUICC is a secure element for hosting profiles. A unique identifier of an eUICC is an EID (eUICC-ID) which can also be referred to as a secure element identifier. A profile is a combination of mobile network operator (MNO) data and applications provisioned on an eUICC in a device for the purposes of providing services by the MNO, also referred to as a cellular carrier, a telecommunications carrier, or a carrier herein. A profile can contain one or more secure data used to prove identity and thus verify contract rights to services. During assembly of a device, the eUICC can be inserted into the device. A manufacturer of the device will associate the device with a SKU.

A profile can be identified by a unique number called an ICCID (Integrated Circuit Card Identifier). Profile management can include a combination of local and remote management operations such as enable profile, disable profile, delete profile, and query profiles present on an eUICC. An MNO provides access capability and communication services to its subscribers through a mobile network infrastructure. In some cases, the device is user equipment used in conjunction with an eUICC to connect to a mobile network. In a machine-to-machine (M2M) environment, a device may not be associated with a user and may have no user interface. An end user is a person using a (consumer or enterprise) device. An enabled profile can include files and/or applications which are selectable over an eUICC-device interface. A device belonging to an end user thus needs a profile in order to make the device functional with a given MNO or carrier.

A function which provides profile packages is known as a subscription manager data preparation (SM-DP, or SM-DP+) or as an eSIM delivery server. An eSIM delivery server may also be referred to as a profile provider. An eSIM is an electronic SIM. An eSIM is an example of a profile. A profile package can be a personalized profile using an interoperable description format that is transmitted to an eUICC as the basis for loading and installing a profile. A bound profile package (BPP) is a profile encrypted with an encryption key based on an identity (or credentials, such as a public key—private key pair) of the eUICC in to which the profile is to be installed. Profile data which is unique to a subscriber, e.g., a phone number or an International Mobile Subscriber Identity (IMSI), are examples of personalization data. The eSIM delivery server communicates over an interface with an eUICC. Certificates used for authentication and confidentiality purposes can be generated by a trusted certificate issuer. Thus, a device can cooperate with an eSIM delivery server to make the device functional for the end user with a given carrier.

A technical specification related to remote provisioning and management of eUICCs in devices is outlined in GSM Association document GSMA SGP.22: "RSP Technical Specification," Version 1.0 Jan. 13, 2016 (hereinafter "SGP.22").

An eUICC includes an operating system, and the operating system can include ability to provide authentication algorithms to network access applications associated with a given operator. The operating system also can include the ability to translate profile package data into an installed profile using a specific internal format of the eUICC. An ISD-P (issuer security domain—profile) can host a unique profile within an eUICC. The ISD-P is a secure container or security domain for the hosting of the profile. The ISD-P is used for profile download and installation based on a received bound profile package. A bound profile package (BPP) is a profile package which has been encrypted for a target eUICC. An ISD-R (issuer security domain—root) is a function in a eUICC responsible for the creation of new ISD-Ps on the eUICC. An ECASD (embedded UICC controlling authority security domain) provides secure storage of credentials required to support the security domains on an eUICC. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC. Thus, a BPP is a kind of data vehicle by which a profile is delivered to a device from an eSIM server. After installation of the eSIM from the BPP, the device becomes functional for the user with the carrier associated with the eSIM.

eUICCs comprise several security domains for the purposes of profile management. Identifiers are associated with security domains. Applications within a security domain have a trust relationship. Further description of profiles (eSIMs), profile provisioning, download of bound profile packages, and of security domains is available in SGP.22.

SUMMARY

Representative embodiments set forth herein disclose various systems and techniques for manufacture of a pool of devices under a single product type identifier, for example, a SKU identifier, distribution to purchasing carriers based upon carrier orders, association of the devices purchased by a given carrier with a product identifier, for example, a carrier-specific SKU identifier, and provisioning of the devices associated with the product identifier by an eSIM delivery server associated with the given carrier. A product type identifier per device type simplifies the supply chain to carrier channels. Having a product type identifier, for example, a single SKU, allows a manufacturer to manage inventory and forecast a number of units to be manufactured more efficiently than manufacturing different sets of devices for different carriers. A manufactured device, in some embodiments, is be shipped to a given carrier channel of several carrier channels (based on purchase by the given carrier). The manufactured device is configured with the correct eSIM for the given carrier after power-on by a purchasing end user.

In some embodiments, one or more factories build devices of a certain description, with the pool of manufactured devices of the certain description being associated with a single initial product type identifier, for example, an initial SKU. The owner of the pool then sells a first set of the manufacturer devices to a first carrier and a second set of the manufactured devices to a second carrier. The devices sold to the first carrier are now associated with a first product identifier, for example, a first SKU distinct from the initial product type identifier. The devices sold to the second carrier are associated with a second product identifier, also distinct from the first product identifier and distinct from the initial product type identifier.

The sale to the first and second carriers from the pool of manufactured devices is possible because the pool of manufactured devices is generic in some sense. That is, one device in the pool is like another, other than serial number, for example. Different carriers provide different services and applications to end users who buy their devices. A given customer-purchased device becomes unique to a given carrier based on an eSIM installed in the customer-purchased device. The carrier-specific eSIM for a device sold through a retail channel of the first carrier, in some embodiments, is installed over the air (or by a wired network connection) by an eSIM delivery server associated with the first carrier after an end user buys a device through the first carrier's channel, takes it out of the box, and turns on the power.

Each device in the pool of manufactured devices houses or is associated with a secure element, for example, an eUICC. Initially, the eUICC has sufficient information to contact a root or discovery server. The discovery server acts as a database of notifications waiting for inquiries from devices. That is, the discovery server, in some instances, stores a notification from a first carrier, and the notification is intended for a particular device housing a particular eUICC. When the device is powered on by the purchasing end user, the device contacts the discovery server for a notification. The notification includes an address of the eSIM delivery server associated with the carrier channel through which the end user bought the device. The device then contacts the eSIM delivery server identified by the notification, and the eSIM delivery server commences to download a BPP to the device. The BPP is targeted to the eUICC in that particular device. The device and eUICC then install the eSIM contained in the BPP into the eUICC. After installation of the eSIM, the device is able to provide services to the end user from the carrier.

In some embodiments, a server known as a policy management center, or policy management server, is notified of the manufactured pool of devices, such as by the factory. The pool of devices is associated with the initial SKU identifier or product type identifier. A given carrier, in some instances, then purchases a subset of the pool of devices. The subset of the pool of devices may be referred to herein as the device subset and the given carrier referred to herein as the purchasing carrier. The policy management server associates a carrier-specific SKU identifier with the device subset and assigns a carrier-specific activation policy to the device sub set.

The policy management server, in some embodiments, performs operations to reserve eSIMs for the device subset. The policy management server does this, for example, by contacting a policy evaluation server. In some embodiments, the policy evaluation server is operated by the owner of the factory output. In some instances, the policy evaluation server is hosted by a mobile device manufacturer. The policy evaluation server, in some instances, contacts an eSIM delivery server associated with the purchasing carrier and requests that eSIMs be reserved for the device subset. The eSIM delivery server reserves a first set of eSIMs. The first set of eSIMs is represented by a first set of ICCID values; there is one ICCID value for each eSIM in the first set. The eSIM delivery provides the first set of ICCID values to the policy evaluation server, which provides them to the policy management server. The purchasing carrier can learn the device/ICCID pairing by making an inquiry to the policy management server through an application interface (API). In some embodiments, a policy management and evaluation server performs the functions described herein with respect to both the policy management server and the policy evaluation server.

After a particular end user buys a device from the purchasing carrier, the end user opens the box in which the device was packaged for sale and powers-up the device. The device then contacts a discovery server and from there learns an address of the eSIM delivery server that reserved an eSIM for that device. The eSIM delivery server than downloads a BPP including the eSIM in encrypted form, to the device. As mentioned above, after installation of the eSIM, the device is able to provide services to the end user from the carrier.

Embodiments described herein provide for the manufacturer of a pool of devices under an initial SKU identifier, sale of the devices as two or more device subsets via two or more carrier channels, association of SKU identifiers with each device subset, assignment of activation policies on a per-SKU basis, purchase of individual devices from the device subsets by end users, and installation of an eSIM in a given device of the individual devices when the given device is powered-up by a given end user. The installed eSIM will correspond to a particular SKU identifier associated with the given device, and the particular SKU identifier is associated with a particular activation policy and with a particular purchasing carrier.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

eSIM Assignment Logic

Figure 1:
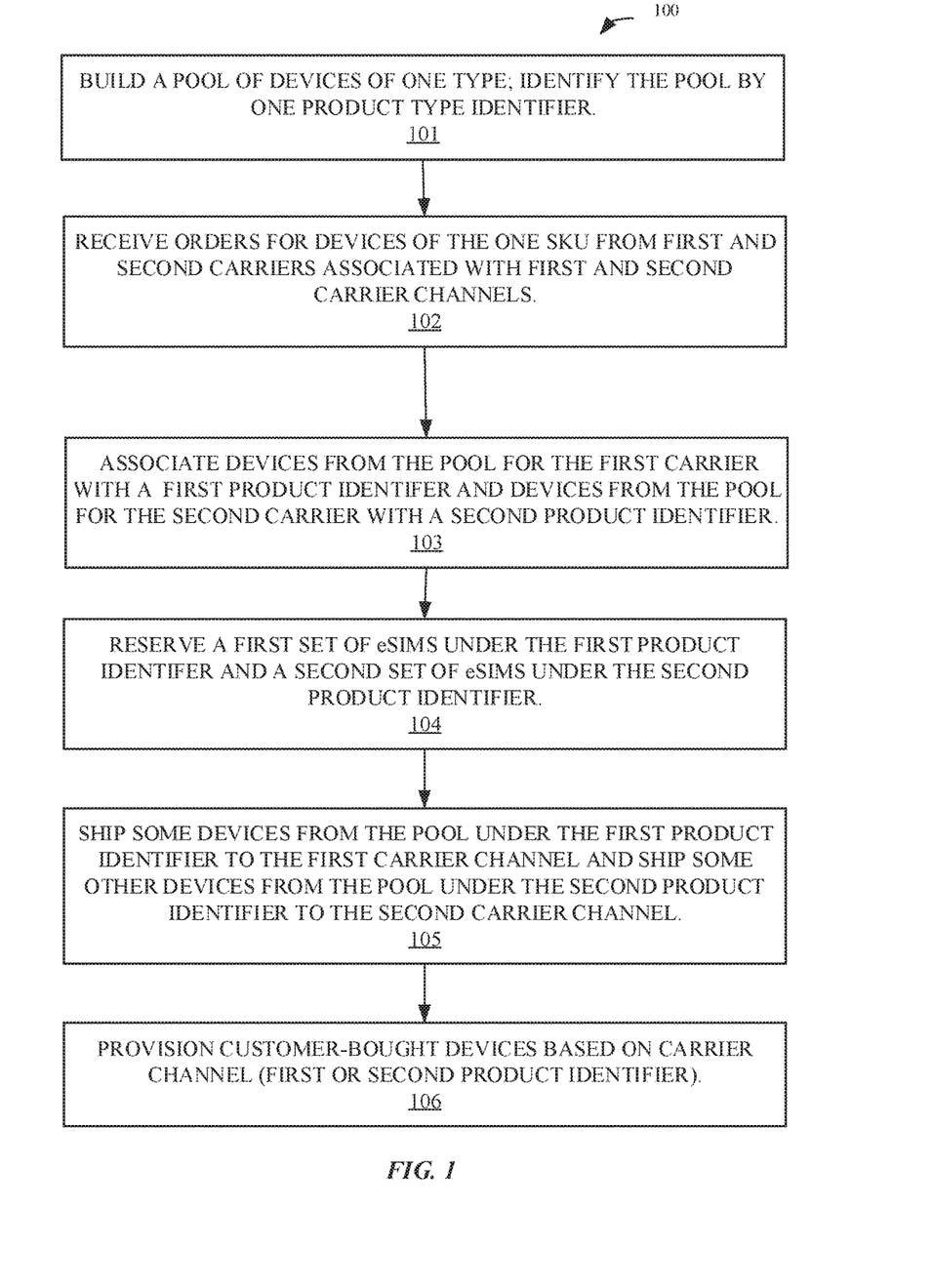
FIG. 1 illustrates exemplary logic for eSIM assignment for carrier channel devices, according to some embodiments.

FIG. 1 illustrates logic 100 for eSIM assignment for carrier channel devices. At 101, a factory builds a pool of devices of one type. The pool of devices is associated with one product type identifier. More than one factory may contribute devices of the one type to the pool. At 102, the owner of the pool of devices receives orders from first and second carriers associated with first and second carrier channels. At 103, a first product identifier is associated with the first carrier and some devices from the pool and a second product identifier is associated with the second carrier and some other devices from the pool. At 104, first and second sets of eSIMs associated with the first and second product identifiers, respectively, are reserved. The reservation is done with first and second eSIM delivery servers. At 105, devices are shipped under the first SKU to the first carrier channel and other devices are shipped under the second SKU to the second carrier channel. At 106, customer-bought devices are provisioned with eSIMs based on carrier channel (first or second SKU).

Conceptual Flow of Devices

Figure 2:
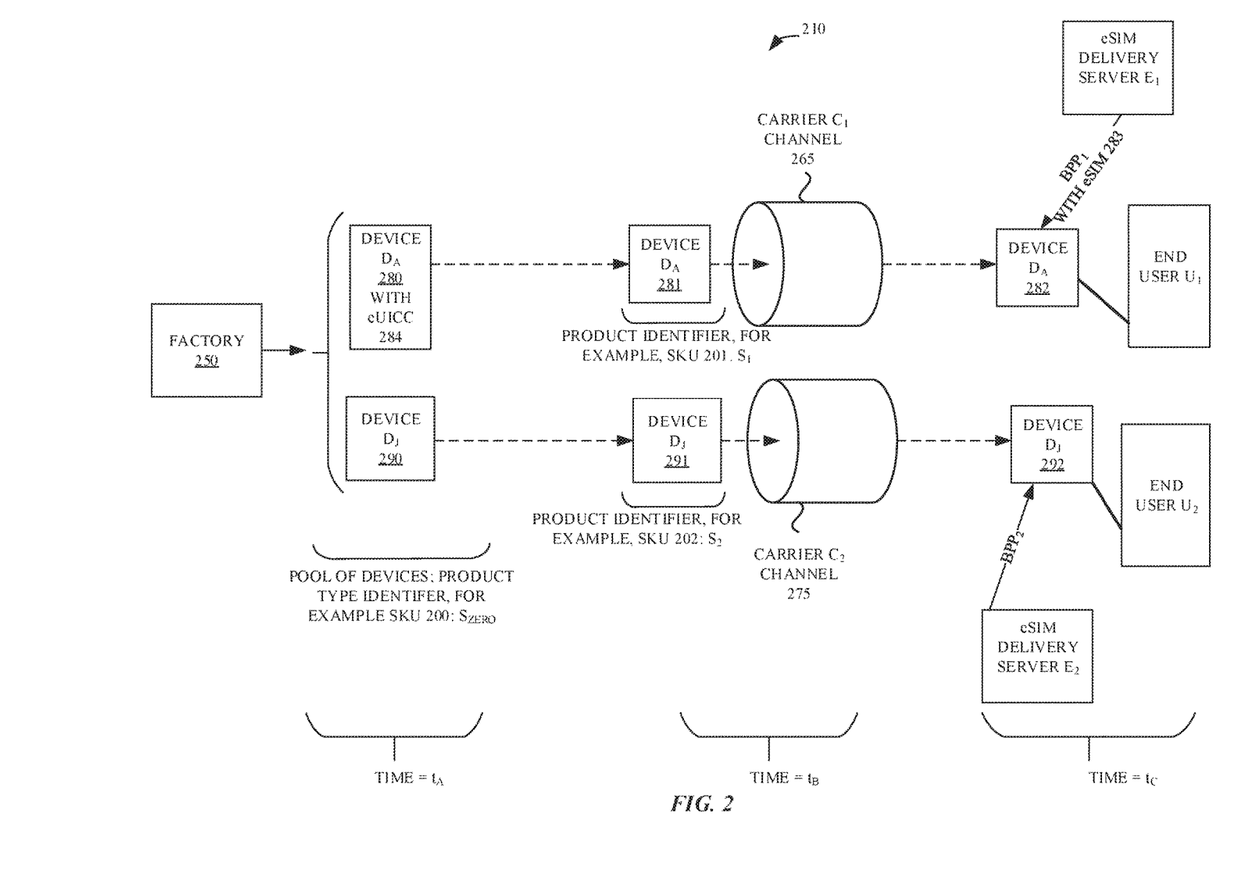
FIG. 2 illustrates a conceptual flow of carrier channel devices over three time epochs or values, according to some embodiments.

FIG. 2 illustrates additional exemplary details of eSIM assignment for carrier channel devices in a system 210. FIG. 2 is a conceptual flow diagram of devices through different places at times $t_A$, $t_B$, and $t_C$. Time $t_A$ corresponds to a factory manufacturing event, time $t_B$ corresponds to devices being assigned to purchasing carriers, and time $t_C$ corresponds to end user purchasing the device and the end user powering-up the device.

At time $t_A$, a factory 250 produces devices $D_A$ 280 and $D_J$ 290 associated with a product type identifier. In some embodiments, the product type identifier is a SKU 200 with value $S_{ZERO}$. SKU 200 represents a variable name, and $S_{ZERO}$ represents a value of that variable. Each device houses an eUICC. The eUICC in device $D_A$ is explicitly noted as eUICC 284. The devices are shipped to different carrier channels 265 and 275. In particular $D_A$ is purchased by a carrier $C_1$ and is shipped to carrier $C_1$ channel 265. Device $D_A$ is now associated with a product identifier linked to carrier $C_1$. For example, device $D_A$, in some embodiments, is now associated with SKU 201 (variable name) with value $S_1$ and is marked with reference numeral 281 in FIG. 2. Similarly, device $D_J$ is now associated with a product identifier linked to carrier $C_2$. For example, device $D_J$, in some embodiments, is associated with SKU 202 (variable name) with value $S_2$ and the device $D_J$ is marked with reference numeral 291.

At a time, or time epoch, $t_C$, devices $D_A$ and $D_J$ are purchased from different carrier stores by end users $U_1$ and $U_2$, respectively. The end users take their new devices out of their boxes and power them up. Upon power-up, device $D_A$ reaches eSIM delivery server $E_1$ (associated with $C_1$) and downloads bound profile package $BPP_1$ including an eSIM 283. The communication channel, in some embodiments, is established over a Wi-Fi (IEEE 802.11 wireless local area network) or a cellular connection. Establishment of a channel over a cellular connection is based upon a bootstrap eSIM present, in some embodiments, in the eUICC 284 from the time $D_A$ left factory 250. A bootstrap eSIM allows limited access to a large number of carrier providers for the purposes of configuring a device. In some embodiments, the device $D_A$ first reaches a discovery server 321 (see FIG. 3A) after power-up to obtain a notification; in this case, the notification would point to the eSIM delivery server $E_1$, and then the device reaches the eSIM server $E_1$ for download of $BPP_1$. The device with eSIM 283 installed is denoted with reference numeral 282 in FIG. 2. Similarly, device $D_J$ contacts, for example, a different eSIM delivery server $E_2$ (associated with $C_2$) and downloads $BPP_2$; $D_J$ is then referred to with the reference numeral 292.

In some embodiments, the purchased device authenticates with the discovery server and then the eSIM delivery server using a public key—private key pair of the eUICC. The private key of the pair is installed in the eUICC by the eUICC manufacturer (EUM). In some embodiments, the device to eSIM delivery server authentication is based on a one time token signed by both the device and by the eSIM delivery server. Both parties verify the signature of the other party using PKI techniques. The discovery server and the eSIM delivery server know the public key of the eUICC because, in some embodiments, the public key of the eUICC is registered with a CI such as a GSMA CI and/or the eUICC has a PKI certificate which is part of a certificate chain signed by the CI. More details on certificates are available in SGP.22.

System Entities

Figure 3A:
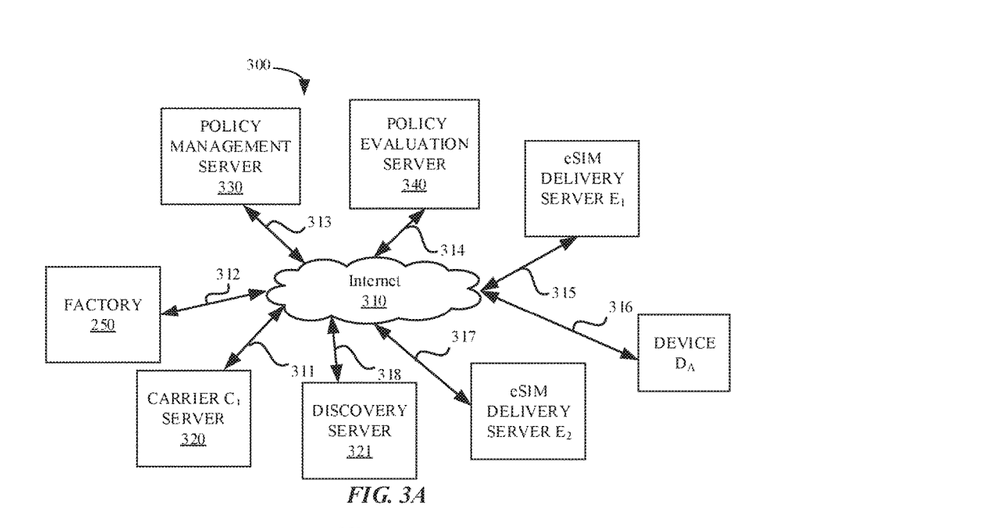
FIG. 3A illustrates an exemplary system and FIG. 3B illustrates an exemplary message flow, for eSIM assignment for carrier channel devices, according to some embodiments.

FIG. 3A illustrates a number of entities in a system 300 involved with exemplary embodiments of eSIM assignment for carrier channel devices. The entities are shown in communication with each other via the Internet 310. Other computer network and direct-connection scenarios are possible. A carrier $C_1$ server 320, the factory 250, a policy management server 330, a policy evaluation server 340, the eSIM delivery server $E_1$, the device $D_A$, the eSIM delivery server $E_2$ and the discovery server 321 communicate using the Internet 310 via interfaces 311, 312, 313, 314, 315, 316, 317, and 318, respectively.

In some embodiments, the policy evaluation server is hosted by a mobile device manufacturer. The mobile device manufacturer receives orders from carriers such as $C_1$ and $C_2$. The carriers determine the activation policies to be associated with the devices, and this information is stored in a database at the policy evaluation server. When the factory 250 ships devices owned by the mobile device manufacturer to a carrier channel, for example, carrier $C_1$ channel 265, the factory 250 notifies the policy evaluation server of the shipment. The policy evaluation server initiates eSIM reservation by contacting the policy evaluation server 340, which then contacts the appropriate eSIM delivery according to the policy for the purchasing carrier.

In other words, the policy management server 330 communicates with the factory 250 and the policy evaluation server 340 as the carriers purchase devices, eSIMs are requested to be assigned, and devices are shipped to carrier channels with associated activation policies, for example. The policy evaluation server 340 communicates with the policy management server 330 and with the eSIM delivery servers $E_1$ and $E_2$ to coordinate eSIM reservations, for example. The carrier $C_1$ server 320, in some embodiments, communicates with the policy management server 330 to learn details of eSIM assignment for a particular device, so that network activation records, in a home location register (HLR), for example, can be updated.

In some embodiments, the roles of the policy management server 330 and the policy evaluation server 340 are combined in a single policy management and evaluation server (see 540 in FIG. 5) performing the combined functions of server 330 and server 340, functions described above. In some embodiments, the policy management and evaluation server is hosted by a mobile device manufacturer.

Message Flow

Figure 3B:
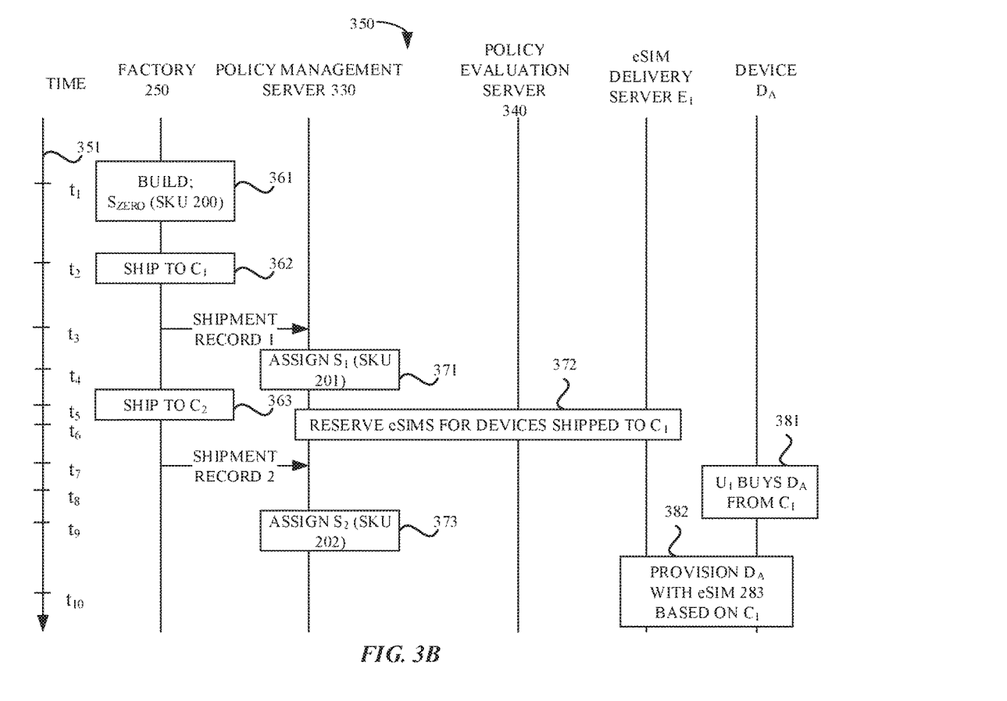

FIG. 3B illustrates exemplary messages and activities 350 related to eSIM assignment for carrier channel devices, in some embodiments. Entity names are given across the top and time advances from top to bottom as indicated by the time axis 351. Ordinal values of time on the axis 351 correspond to time instants or time epochs of the described messages and activities. At a time $t_1$, factory 250 builds a pool of devices under a product type identifier. In some embodiments, there is no association between the product type identifier and any particular carrier. In some embodiments, the product type identifier is a SKU 200 with SKU identifier $S_{ZERO}$ as indicated at reference numeral 361. At a time $t_2$, based on an order (not shown) from the carrier $C_1$, the factory ships a first set of devices from the pool to the carrier $C_1$ channel as indicated at reference numeral 362. Carrier $C_1$ stipulates an activation policy $P_1$ to be associated with the first set of devices. An activation policy is a representation of how the device can be activated by an end user with a carrier. A locked policy requires that a purchasing end user only activate a device with, for example, carrier $C_1$. An unlocked policy allows a purchasing end user to activate a device with any carrier.

At a time $t_3$, the factory sends a shipment record 1 to the policy management server 330. The policy management server 330 then, at $t_4$, assigns a product identifier to the first set of devices (activity 371). The product identifier is associated with the activation policy $P_1$ stipulated by the carrier $C_1$. For example, in some embodiments, the policy management server assigns a value $S_1$ to SKU 201 and associates SKU 201 (and activation policy $P_1$) with the first set of devices.

At $t_6$, activity 372 occurs in which the policy management server 330 works with the policy evaluation server 340 and the eSIM delivery server $E_1$ to reserve eSIMs for the first set. The policy management server 330 conveys to the policy evaluation server device identifiers such as IMEI values of the devices in the first set and eUICC identifiers such as EID values of the eUICCs in those devices. In some embodiments, the policy evaluation server 340 performs an authorization check to see if an eSIM from $C_1$ should be preassigned (reserved) for a device, for example, for device $D_A$. The policy management server 330, in some embodiments, conveys to the policy evaluation server 340 the policy $P_1$ and carrier $C_1$ configuration information associated with the product identifier of the first set of devices. In some embodiments, the policy evaluation server 340 determines a first eSIM delivery server based on the product identifier associated with the first set of devices. If an eSIM should be preassigned (reserved), activity 372 includes: i) policy evaluation server 340 sending a request to eSIM delivery server $E_1$ including IMEI values and EID values of the devices and associated secure elements, respectively, of the devices in the first set of devices, ii) eSIM delivery server $E_1$ reserving eSIMs, for example, eSIM 283 for eUICC 284, iii) eSIM delivery server $E_1$ sending eSIM identifiers, for example, ICCID values, of reserved eSIMs to policy evaluation server 340 and iv) policy evaluation server 340 forwarding the eSIM identifiers to policy management server 330. Thus event or activity 372 includes reserving eSIMs for DA and for the other devices shipped to the carrier $C_1$ channel. In some embodiments, carrier $C_1$ may send an inquiry to the policy management server 330 to learn the identity of the eSIM preassigned to a particular device.

Event 381 at time $t_8$ corresponds to the end user $U_1$ buying the device $D_A$ from the carrier $C_1$ channel. At $t_{10}$, activity 382 occurs in which the eSIM delivery server $E_1$ provisions $D_A$ with the eSIM 283 based on the activation policy associated with the carrier $C_1$ by the policy management server 330.

Without any specific relationship to the events at $t_2$, $t_3$ and $t_4$, a second set of devices is shipped to the carrier $C_2$ channel at $t_5$ (activity 363), a shipment record 2 is sent to the policy management server 330 at $t_7$, and a product identifier linked with carrier $C_2$ is assigned (activity 373). For example, in some embodiments, a SKU with value $S_2$ is assigned to the second set at $t_9$. Messages and events with regard to the second set of devices are similar to the messages and events described above (for example, reference numerals 372, 381, 382 and the context thereof) with respect to the first set of devices.

Logic, Detailed Example

Figure 4:
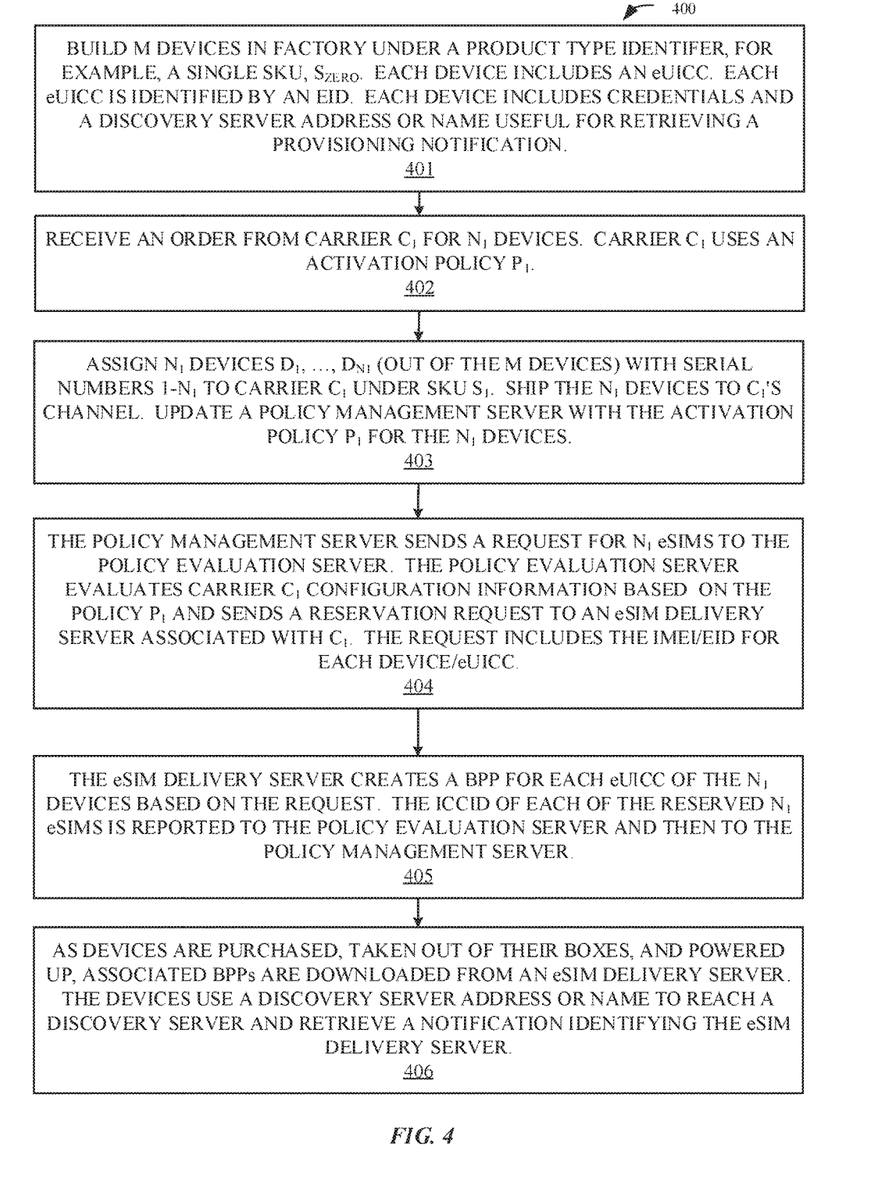
FIG. 4 illustrates exemplary logic for eSIM assignment for carrier channel devices with respect to SKU identifiers, activation policies, various servers, and BPP installation, according to some embodiments.

FIG. 4 illustrates exemplary logic 400 for eSIM assignment for carrier channel devices. At 401, a factory builds a pool of M devices under a single product type identifier. For example, in some embodiments, the product type identifier is a SKU with value $S_{ZERO}$. Each device houses an eUICC, and each eUICC is identified by an EID. At 402, an order is received from the carrier $C_1$ for a quantity of $N_1$ devices ($N_1$ is the number of devices). Carrier $C_1$ composes a subset by taking $N_1$ devices from the pool of M devices. Carrier $C_1$ uses activation policy $P_1$ for these $N_1$ devices. At 403, $N_1$ devices (the subset) with serial numbers or IMEI values represented as $1, \ldots, N_1$, out of the pool of M devices are assigned to $C_1$ under a product identifier. For example, the product identifier in some embodiments is a SKU with SKU value $S_1$. The $N_1$ devices are shipped to the carrier $C_1$ channel.

The factory informs a policy management server of the shipment. The policy management server updates a database with information associating the policy $P_1$ with the $N_1$ devices. At 404, the policy management server sends a request for $N_1$ eSIMs to a policy evaluation server. The policy evaluation server evaluates carrier $C_1$ configuration information based on the policy $P_1$ and sends a reservation request to an eSIM delivery server associated with the carrier $C_1$. The request includes IMEI and EID values for each device and its corresponding eUICC, respectively. At 405, the eSIM delivery server creates a BPP for each eUICC of the $N_1$ devices in the subset based on the request. The ICCID of each of the $N_1$ reserved eSIMs is reported to the policy evaluation server and, from there, to the policy management server.

At 406, devices are purchased, taken out of their boxes and powered up, and associated BPPs are downloaded. The devices were shipped with address information to reach a discovery server. The devices check, after the power-up, with the discovery server for any notifications. Based on the notifications, customer-purchased devices communicate with the proper eSIM delivery server to commence the BPP download, followed by eSIM installation.

Detailed Conceptual Flow of Devices

Figure 5:
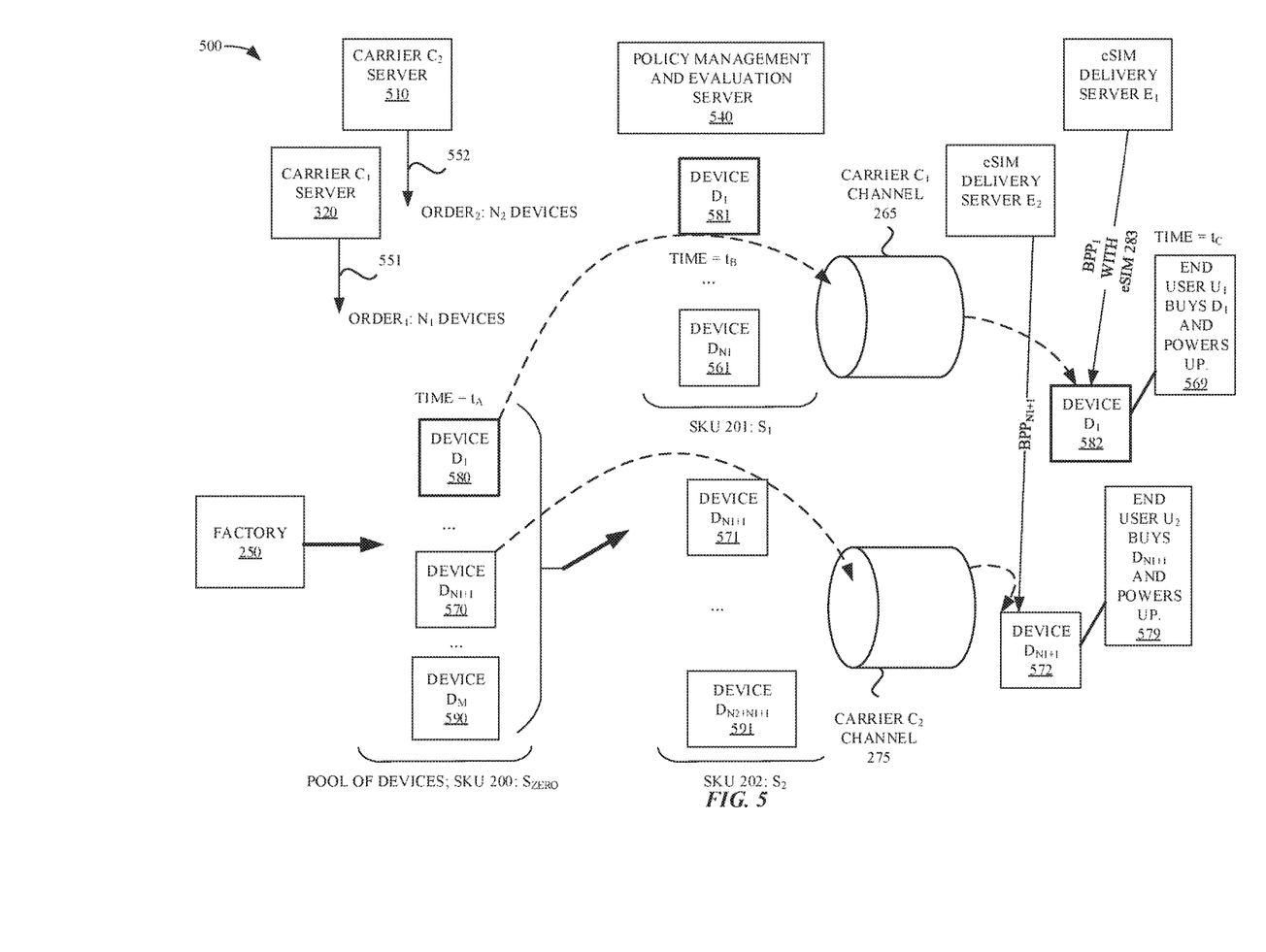
FIG. 5 illustrates a conceptual flow of carrier channel devices over three time epochs or values, for two carrier channels and example devices purchased by end users, according to some embodiments.

FIG. 5 is an example conceptual flow or system 500 similar to system 210 introduced in FIG. 2. FIG. 5 exemplifies the logic of FIGS. 1 and 4 in the system of FIG. 3A with the messages of FIG. 3B. In FIG. 5, device $D_1$ plays the role of device $D_A$ of FIG. 2. FIG. 5 illustrates the factory output, the carrier purchases, example end-user purchases, and provisioning of a device, after customer purchase of the device, with a previously-assigned eSIM.

In FIG. 5, times $t_A$, $t_B$, and $t_C$ correspond to times or time epochs of the same name in FIG. 2. That is, time $t_A$ corresponds to a factory manufacturing event, time $t_B$ corresponds to devices being assigned and shipped to purchasing carriers, and time $t_C$ corresponds to end user purchasing/device powering-up events. The factory produces the pool of M devices under a product type identifier. For example, the product type identifier, in some embodiments, is a SKU 200 with value $S_{ZERO}$. The devices are denoted $D_1$ through $D_M$ including device $D_{N1+1}$ These three devices are denoted in FIG. 5 with reference numerals 580, 590 and 570, respectively. The ellipsis symbols in the pool of devices, "... 570 ...", indicate other devices are present that bring the total number of manufactured devices in the pool up to the number M.

Carrier $C_1$, in some embodiments using the carrier server 320, places order 551 ("Order$_1$") ordering $N_1$ devices and carrier $C_2$, using carrier server 510, places order 552 ("Order$_2$") ordering $N_2$ devices. These orders may occur before or after the factory 250 produces the M devices. The upper dashed line shows the progress of device $D_1$ from factory 250 to end user $U_1$ and the lower dashed line shows the progress of device $D_{N1+1}$ from the factory 250 to the end user $U_2$.

The pool of M devices at time $t_A$ and associated with SKU 200 with value $S_{ZERO}$ is $\{D_1 \ldots D_{N1+1} D_M\}$ marked by reference numerals 580, 570, and 590. A first set of devices (a subset of the pool of M devices), destined for $C_1$ at time $t_B$, is associated with a product identifier linked with $C_1$, for example, a SKU 201 value $S_1$, is $\{D_1 \ldots D_{N1}\}$. This first set is marked by exemplary reference numerals 581 and 561. A second set of devices (a second subset of the pool of M devices), destined for $C_2$ at time $t_B$, is associated with another product identifier (linked with $C_2$), for example, a SKU 202 with value $S_2$ is $\{D_{N1+1} \ldots D_{N2+N1+1}\}$. The second set is marked by exemplary reference numerals 571 and 591. At time $t_B$, after association with SKU 201, the devices $D_1$ and $D_{N1}$ are marked with reference numerals 581 and 561. After end user $U_1$ purchases $D_1$ and the completion of provisioning the eSIM 283, $D_1$ is marked with reference numeral 582.

In particular, based on the order 551, $N_1$ devices are associated with SKU 201 (with value $S_1$) and shipped to carrier $C_1$ channel 251. eSIMs are reserved by the policy management and evaluation server 540 working with the eSIM delivery server $E_1$. In FIG. 5, exemplary policy management and evaluation server 540 performs the functions of both policy management server 330 and policy evaluation server 340 (see FIGS. 3 and 4 and accompanying description). The reserved eSIMs for the devices $D_1$ through $D_{N1}$ comply with the activation policy of $C_1$. The end user $U_1$ purchases the device $D_1$ at the time $t_C$, opens the box and powers $D_1$ up (see reference numeral 569). $D_1$, in some embodiments, uses a Wi-Fi data connection to reach the Internet 310. In some embodiments, a eUICC in $D_1$ includes a bootstrap eSIM, and the device $D_1$ reaches the Internet by way of a cellular base station permitting access based on the bootstrap eSIM. $D_1$ thus reaches the eSIM delivery server $E_1$, possibly after a query to the discovery server 321 for pending notifications. The eSIM delivery server $E_1$ provisions $D_1$ with the eSIM 283 via the bound profile package $BPP_1$. The Carrier $C_1$ server 320, in some embodiments, queries the policy management and evaluation server 540 via an API to learn the EID/ICCID value pair associated with the eUICC/eSIM of, for example, the device $D_1$. The carrier $C_1$ then uses the particular EID/ICCID value pair when authenticating network access requests from $D_1$.

Similar events happen for the carrier $C_2$ shown by devices $D_{N1+1}$ (reference numeral 570, 571, 572) passing through carrier $C_2$ channel 275 with the device $D_{N1+1}$ reaching end user $U_2$ (see reference numeral 579) and being provisioned with $BPP_{N1+1}$ by the eSIM delivery server $E_2$.

Network Connection After Purchase

Figure 6:
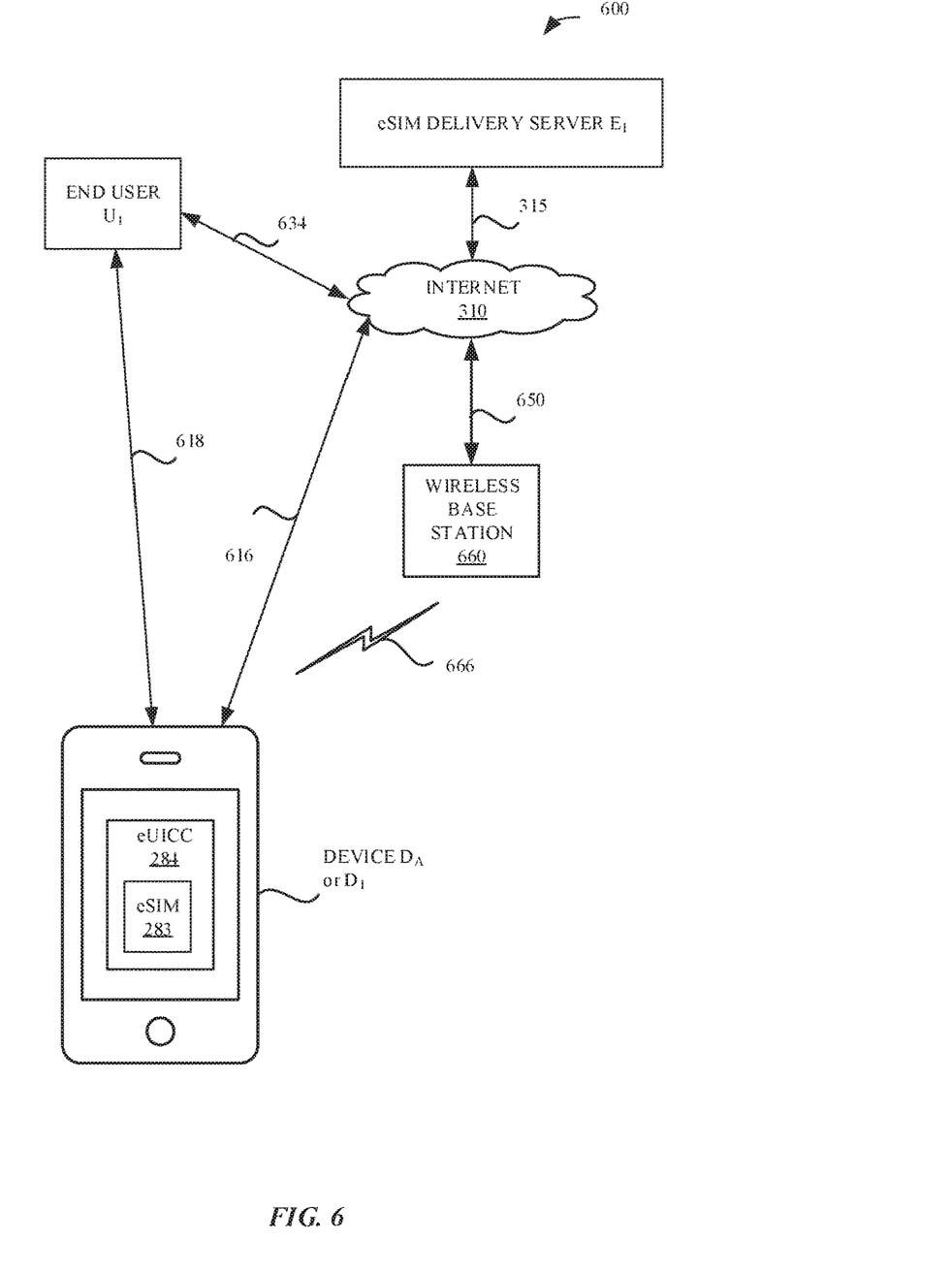
FIG. 6 illustrates an exemplary device in communication with an eSIM delivery server, according to some embodiments.

FIG. 6 illustrates example connection methods for provisioning of the device $D_A$ or $D_1$ in a system 600; the figure will be described with respect to $D_1$. End user $U_1$ can locally manage device $D_1$ using interface 618 which can represent end user actions. The end user $U_1$ can also remotely manage device $D_1$ via the Internet 310 using interface 634. The device $D_1$ is shown connected to a wireless base station 660. The wireless base station 660 communicates with the device $D_1$ via a wireless link 666 and with the Internet 310 via the link 650. The wireless base station 660 can be an Institute of Electronic and Electrical Engineers 802.11 Wireless Fidelity (IEEE 802.11 Wi-Fi) access point (AP) or the wireless base station 660 can be, for example, a cellular mobile network base station. In some embodiments, device $D_1$ is shipped from factory 250 with a bootstrap eSIM useful for accessing an eSIM delivery server through wireless base station 660 when wireless base station 660 is operated by any one of several different cellular network operators. Examples of cellular mobile network base stations are a 2G or 3G base station or an LTE eNode B. The device $D_1$ can also connect to the Internet 310 via a wired connection 616.

Variety of Radio Access Technologies

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 7:
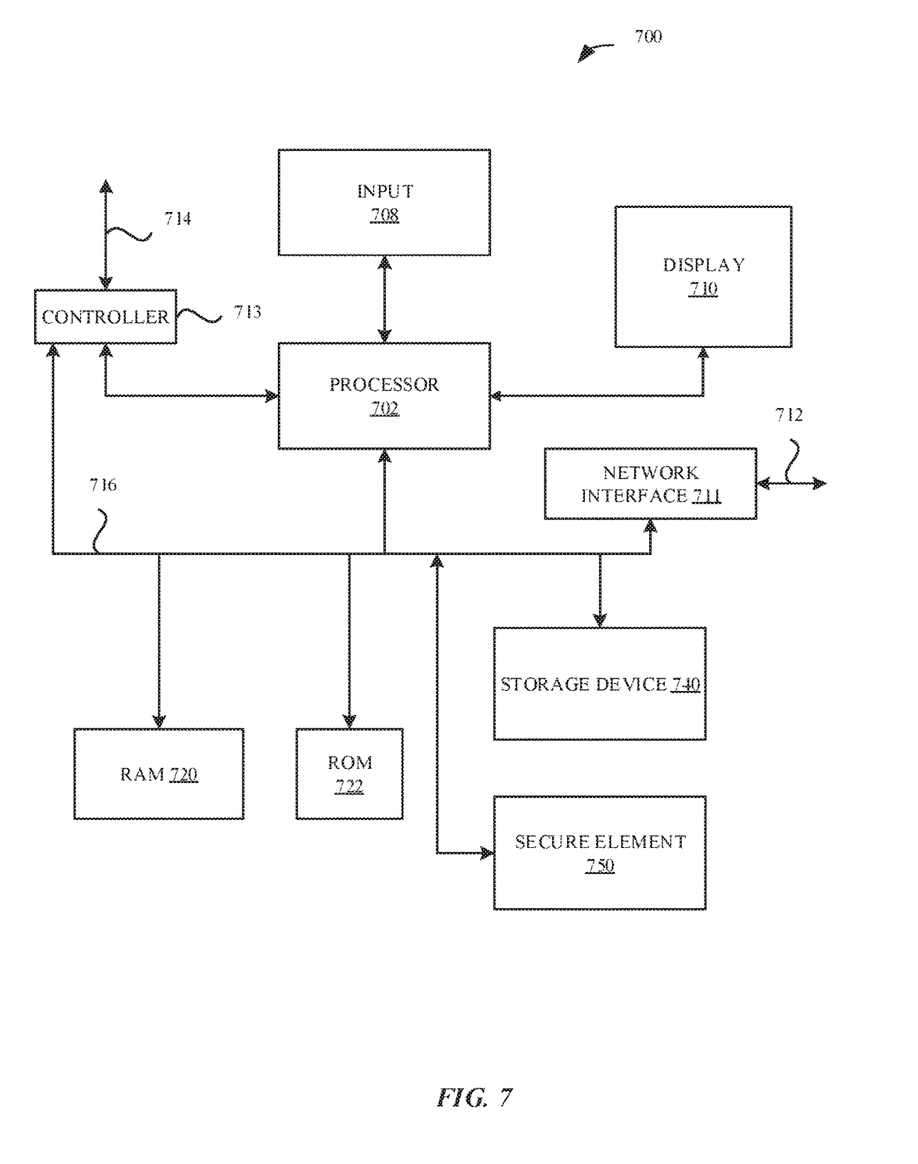
FIG. 7 illustrates an exemplary apparatus for implementation of the embodiments disclosed herein.

FIG. 7 illustrates in block diagram format an exemplary computing device 700 that can be used to implement the various components and techniques described herein, according to some embodiments. In particular, the detailed view of the exemplary computing device 700 illustrates various components that can be included in the device $D_A$, the device $D_1$, the policy management server 330, the policy evaluation server 340, or the policy management and evaluation server 540 illustrated in FIG. 2, 3A, 3B, or 5. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user (for example, information relating to incoming, outgoing, or active communication session). A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor. The computing device 700 can also include a secure element 750. The secure element 750 can include an eUICC or a UICC.

The computing device 700 also includes a storage device 740, which can comprise a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. In some embodiments, the computer readable medium is a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A policy evaluation server comprising:
a memory; and
one or more processors, wherein the memory includes instructions that, when executed by a processor of the one or more processors, cause the policy evaluation server to perform operations comprising:
determining a first eSIM delivery server based on a first product identifier of a first device, wherein: i) the first device is identified by a first device identification number, and ii) the first device is associated with a first secure element (SE),
sending a first request message, wherein the first request message: i) requests reservation of a first eSIM, ii) includes the first device identification number, and iii) includes a first SE identifier of the first SE,
determining a second eSIM delivery server based on a second product identifier of a second device, wherein: i) the second device is identified by a second device identification number, and ii) the second device is associated with a second SE, and
sending a second request message, wherein the second request message: i) requests reservation of a second eSIM, ii) includes the second device identification number, and iii) includes a second SE identifier of the second SE.

2. The policy evaluation server of claim 1, wherein the sending the first request message comprises sending the first request message to the first eSIM delivery server.

3. The policy evaluation server of claim 1, wherein: i) the first product identifier is a first stock keeping unit (SKU) number associated with a first telecommunications carrier, and ii) the second product identifier is a second SKU number associated with a second telecommunications carrier different from the first telecommunications carrier.

4. The policy evaluation server of claim 3, wherein the operations further comprise:
identifying an activation policy stipulated by the first telecommunications carrier.

5. The policy evaluation server of claim 4, wherein the first eSIM is in conformance with the activation policy.

6. The policy evaluation server of claim 4, wherein: i) the activation policy is a representation of how the first device can be activated by an end user with a telecommunications carrier, and ii) the activation policy is a locked activation policy requiring that a purchasing end user only activate the first device with the first telecommunications carrier or the activation policy is an unlocked activation policy allowing the purchasing end user to activate the first device with a telecommunications carrier other than the first telecommunications carrier.

7. The policy evaluation server of claim 1, wherein the operations further comprise:
receiving, from the first eSIM delivery server, a first report, wherein the first report comprises a first eSIM identifier for the first eSIM; and
receiving, from the second eSIM delivery server, a second report, wherein the second report comprises a second eSIM identifier for the second eSIM.

8. The policy evaluation server of claim 7, wherein the operations further comprise:
sending the first eSIM identifier to a policy management server; and
sending the second eSIM identifier to the policy management server.

9. A method by a policy evaluation server, the method comprising:
by the policy evaluation server:
determining a first eSIM delivery server based on a first product identifier of a first device, wherein: i) the first device is identified by a first device identification number, and ii) the first device is associated with a first secure element (SE),
sending a first request message, wherein the first request message: i) requests reservation of a first eSIM, ii) includes the first device identification number, and iii) includes a first SE identifier of the first SE,
determining a second eSIM delivery server based on a second product identifier of a second device, wherein: i) the second device is identified by a second device identification number, and ii) the second device is associated with a second SE, and
sending a second request message, wherein the second request message: i) requests reservation of a second eSIM, ii) includes the second device identification number, and iii) includes a second SE identifier of the second SE.

10. The method of claim 9, wherein the sending the first request message comprises sending the first request message to the first eSIM delivery server.

11. The method of claim 9, wherein: i) the first product identifier is a first stock keeping unit (SKU) number associated with a first telecommunications carrier, and ii) the second product identifier is a second SKU number associated with a second telecommunications carrier different from the first telecommunications carrier.

12. The method of claim 11, further comprising:
by the policy evaluation server:
identifying an activation policy stipulated by the first telecommunications carrier.

13. The method of claim 12, wherein the first eSIM is in conformance with the activation policy.

14. The method of claim 12, wherein: i) the activation policy is a representation of how the first device can be activated by an end user with a telecommunications carrier, and ii) the activation policy is a locked activation policy requiring that a purchasing end user only activate the first device with the first telecommunications carrier or the activation policy is an unlocked activation policy allowing the purchasing end user to activate the first device with a telecommunications carrier other than the first telecommunications carrier.

15. The method of claim 9, further comprising:
by the policy evaluation server:
receiving, from the first eSIM delivery server, a first report, wherein the first report comprises a first eSIM identifier for the first eSIM;
receiving, from the second eSIM delivery server, a second report, wherein the second report comprises a second eSIM identifier for the second eSIM;
sending the first eSIM identifier to a policy management server; and
sending the second eSIM identifier to the policy management server.

16. A non-transitory computer readable medium comprising instructions that, when executed by a processor of a policy evaluation server, cause the policy evaluation server to perform operations comprising:
determining a first eSIM delivery server based on a first product identifier of a first device, wherein: i) the first device is identified by a first device identification number, and ii) the first device is associated with a first secure element (SE),
sending a first request message, wherein the first request message: i) requests reservation of a first eSIM, ii) includes the first device identification number, and iii) includes a first SE identifier of the first SE,
determining a second eSIM delivery server based on a second product identifier of a second device, wherein: i) the second device is identified by a second device identification number, and ii) the second device is associated with a second SE, and
sending a second request message, wherein the second request message: i) requests reservation of a second eSIM, ii) includes the second device identification number, and iii) includes a second SE identifier of the second SE.

17. The non-transitory computer readable medium of claim 16, wherein:
i) the first product identifier is a first stock keeping unit (SKU) number associated with a first telecommunications carrier,
ii) the second product identifier is a second SKU number associated with a second telecommunications carrier different from the first telecommunications carrier, and
iii) the operations further comprise identifying an activation policy stipulated by the first telecommunications carrier.

18. The non-transitory computer readable medium of claim 17, wherein the first eSIM is in conformance with the activation policy.

19. The non-transitory computer readable medium of claim 17, wherein: i) the activation policy is a representation of how the first device can be activated by an end user with a telecommunications carrier, and ii) the activation policy is a locked activation policy requiring that a purchasing end user only activate the first device with the first telecommunications carrier or the activation policy is an unlocked activation policy allowing the purchasing end user to activate the first device with a telecommunications carrier other than the first telecommunications carrier.

20. The non-transitory computer readable medium of claim 17, wherein the operations further comprise:
receiving, from the first eSIM delivery server, a first report, wherein the first report comprises a first eSIM identifier for the first eSIM;
receiving, from the second eSIM delivery server, a second report, wherein the second report comprises a second eSIM identifier for the second eSIM;
sending the first eSIM identifier to a policy management server; and
sending the second eSIM identifier to the policy management server.

* * * * *